(12) United States Patent
Walser et al.

(10) Patent No.: US 8,798,794 B2
(45) Date of Patent: Aug. 5, 2014

(54) METHOD AND SYSTEM FOR HIGHLY PRECISELY POSITIONING AT LEAST ONE OBJECT IN AN END POSITION IN SPACE

(75) Inventors: Bernd Walser, Heerbrugg (CH); Bernhard Metzler, Dornbirn (AT); Beat Aebischer, Heerbrugg (CH); Knut Siercks, Moerschwil (CH); Bo Pettersson, London (GB)

(73) Assignee: Leica Geosystems AG, Heerbrugg (CH)

( * ) Notice: Subject to any disclaimer, the term of this patent is extended or adjusted under 35 U.S.C. 154(b) by 452 days.

(21) Appl. No.: 13/322,123

(22) PCT Filed: May 26, 2010

(86) PCT No.: PCT/EP2010/057282
§ 371 (c)(1),
(2), (4) Date: Nov. 22, 2011

(87) PCT Pub. No.: WO2010/136507
PCT Pub. Date: Dec. 2, 2010

(65) Prior Publication Data
US 2012/0072021 A1 Mar. 22, 2012

(30) Foreign Application Priority Data
May 27, 2009 (EP) .................. 09161295

(51) Int. Cl.
*B25J 13/08* (2006.01)
*B25J 19/04* (2006.01)
*B25J 9/16* (2006.01)
*G06T 7/00* (2006.01)

(52) U.S. Cl.
CPC .............. *B25J 9/1697* (2013.01); *B25J 9/1612* (2013.01); *B25J 9/1692* (2013.01); *G06T 7/004* (2013.01); *G06T 7/0042* (2013.01); *Y10S 901/08* (2013.01); *Y10S 901/09* (2013.01); *Y10S 901/14* (2013.01); *Y10S 901/31* (2013.01); *Y10S 901/47* (2013.01)

USPC ........... 700/254; 700/245; 700/250; 700/253; 700/259; 901/8; 901/9; 901/14; 901/31; 901/47; 382/103; 382/151; 382/153; 382/154

(58) Field of Classification Search
CPC ........... G06K 9/00201; G06K 9/00208; G06T 7/004; G06T 7/0042; G06T 7/0046; G06T 7/0018; G06T 7/0022; B25J 9/1697; B25J 9/1612; B25J 9/1692
USPC ......... 700/245, 250, 252, 253, 254, 259, 262; 901/2, 6, 8, 9, 11, 14–18, 31, 47; 382/103, 106, 151, 153, 154
See application file for complete search history.

(56) References Cited

U.S. PATENT DOCUMENTS 4,575,304 A * 3/1986 Nakagawa et al. ........... 414/730
(Continued)

FOREIGN PATENT DOCUMENTS

CN 1914481 A 2/2007
(Continued)

*Primary Examiner* — Thomas Black
*Assistant Examiner* — Sara Nelson
(74) *Attorney, Agent, or Firm* — Maschoff Brennan

(57) ABSTRACT

An object is highly precisely moved by an industrial robot to an end position by the following steps, which are repeated until the end position is reached within a specified tolerance: Recording a three-dimensional image by means of a 3-D image recording device. Determining the present position of the object in the spatial coordinate system from the position of the 3-D image recording device the angular orientation of the 3-D image recording device detected by an angle measuring unit, the three-dimensional image, and the knowledge of features on the object. Calculating the position difference between the present position of the object and the end position. Calculating a new target position of the industrial robot while taking into consideration the compensation value from the present position of the industrial robot and a value linked to the position difference. Moving the industrial robot to the new target position.

27 Claims, 4 Drawing Sheets

(56) References Cited

U.S. PATENT DOCUMENTS

| | | | |
|---|---|---|---|
| 4,613,269 A * | 9/1986 | Wilder et al. | 700/259 |
| 4,851,905 A | 7/1989 | Pryor | |
| 5,380,978 A | 1/1995 | Pryor | |
| 5,706,408 A * | 1/1998 | Pryor | 700/259 |
| 6,236,896 B1 * | 5/2001 | Watanabe et al. | 700/37 |
| 7,386,365 B2 * | 6/2008 | Nixon | 700/245 |
| 8,295,585 B2 | 10/2012 | Wienand et al. | |
| 8,498,745 B2 * | 7/2013 | Umetsu | 700/254 |
| 2004/0243282 A1 * | 12/2004 | Watanabe et al. | 700/259 |
| 2006/0008136 A1 * | 1/2006 | Leroux | 382/153 |
| 2007/0177790 A1 * | 8/2007 | Ban et al. | 382/153 |
| 2009/0055024 A1 * | 2/2009 | Kay | 700/259 |
| 2010/0274390 A1 * | 10/2010 | Walser et al. | 700/259 |

FOREIGN PATENT DOCUMENTS

| | | |
|---|---|---|
| DE | 10 2007 016056 A1 | 10/2008 |
| EP | 1 345 099 A2 | 9/2003 |
| WO | 2005/039836 A2 | 5/2005 |
| WO | 2006/079617 A1 | 8/2006 |
| WO | 2007/004983 A1 | 1/2007 |

* cited by examiner

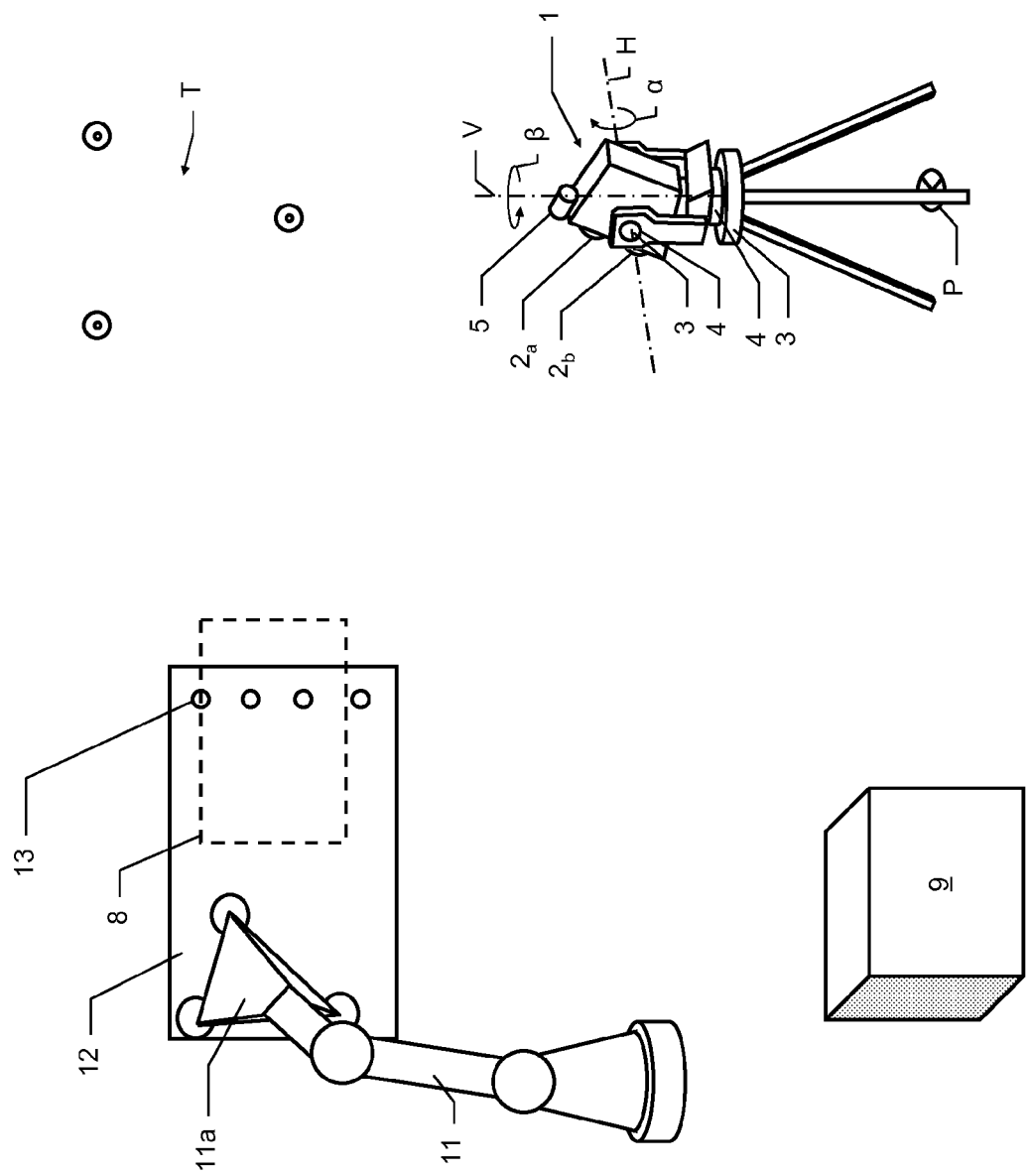

METHOD AND SYSTEM FOR HIGHLY PRECISELY POSITIONING AT LEAST ONE OBJECT IN AN END POSITION IN SPACE

FIELD OF THE INVENTION

The invention relates to a method for highly precisely positioning at least one object having known optically detectable features in an end position in space by means of an industrial robot and an optical 3D image recording device, and to corresponding systems for carrying out this method. Such methods and systems find application, in particular, in assembly and manufacturing operations in automated production lines, for example in the automotive industry, in which an object for example a sheet metal or other body part, is intended to be brought, by means of an industrial robot, highly precisely to a specific position and alignment in space for carrying out a work step.

BACKGROUND

The handling systems known from the prior art, more particularly industrial robots, e.g. articulated-arm robots, for positioning an object gripped by means of a gripping apparatus in a specific position and alignment in space, have internal measuring systems which can detect the position of the elements of the handling system and thus give information about the position and alignment of the gripping apparatus in space. In this case, a distinction should be drawn between axially related and spatially related coordinate systems. The axially related coordinate systems relate in each case to an axis of the robot and the respective position thereof. The kinematic chain of the individual axes and elements of the robot and the respective positions thereof yields the unique position (position and alignment) of the robot tool, that is to say of the gripping apparatus, at the end of the kinematic chain. However, the position of the gripping apparatus of an industrial robot is preferably described in a spatially related manner by means of the so-called TCP, the tool center point. This is an imaginary reference point situated at a suitable location on the robot tool. In order to describe what position the robot tool is intended to assume, the position of the TCP in space and its rotation are defined. In particular by means of the so-called Denavit-Hartenberg transformation, the robot controller calculates what position the individual robot axes have to assume, such that the robot tool assumes the predetermined position. The position of the gripping apparatus with the TCP thereof preferably relates to the world coordinate system, the spatial coordinate system or the cell coordinate system which, for example, is directly or indirectly related to the base of the first axis, the primary axis, the basic frame or the robot base of the robot and is coupled thereto. The remaining sub-coordinate systems are related to said world coordinate system, spatial coordinate system or cell coordinate system. It goes without saying that said world coordinate system, spatial coordinate system or cell coordinate system need not be an absolute world system; rather, said system can also be subordinate to another system. This therefore involves a coordinate system which forms the superordinate reference system within the process. Said system is usually coupled to the floor of the process factory, of the process space or of the process cell.

Consequently, it is possible to adjust the gripping apparatus including the gripped object to a specific predetermined position by corresponding inputting to the robot controller. The gripped object is therefore positioned by predetermining a position of the gripping apparatus in space. In this case, however, the following two problems, in particular, arise.

Firstly, the measuring system of conventional industrial robots designed for holding heavy objects is not precise enough that the gripping apparatus can assume an exact position in space such as is required in some manufacturing methods. Although the drives of industrial robots are sufficiently precise, the measuring systems thereof are not. By virtue of the kinematic chain, the measurement errors of the individual measurement elements are multiplied. This arises both from the measurement inaccuracy of the individual measurement elements, in particular of the angle measuring devices of an articulated-arm robot, and from the unavoidable elasticity of the robot elements.

Secondly, the position of the object in space does not yet necessarily emerge from the position of the gripping apparatus and thus the position thereof in space, since the object can usually only be gripped within a gripping tolerance. This gripping tolerance is often far above the required positioning accuracy. Consequently, the gripping error, that is to say the relative position of the object with respect to the gripping apparatus, likewise has to be taken into account. Separate measuring systems that no longer belong to the robot, in particular contactless optical measuring systems, are used for this purpose. Only these make it possible to position the object in space with the required accuracy in a specific position.

WO 2007/004983 A1 (Pettersson) discloses a method for the joining welding of workpieces, in particular pressed sheet metal parts or composite metal sheets. The workpieces to be joined together are held by industrial robots and positioned by the latter relative to one another for the mutual welding connection. During the production of the welding connection, the workpieces are held by the industrial robots in the respective positions, such that the relative position of the parts with respect to one another is maintained. The welding is effected by means of a welding robot, for example. A measuring system measures the positions of the workpieces in order to enable the workpieces to be positioned before the welding operation. The measurement is effected continuously, in particular, during the welding operation. The method described makes it possible to dispense with the otherwise conventional workpiece-specific moulds and workpiece receptacles which are complicated to produce and into which the workpieces have to be fixed prior to welding. The industrial robots can be used universally for differently shaped and designed workpieces, since, by detecting the position of the workpieces by means of the measuring system, it is possible to identify and supervise the workpieces and also to effect accurate relative positioning of the parts with respect to one another. Consequently, it is possible to use a single system for different workpieces. It is thus unnecessary to change workpiece receptacles. In accordance with the disclosure, the method described is suitable, in particular, for welding sheet metal parts, primarily in the automotive industry. A laser triangulation method in which previously defined points on the workpiece are measured is mentioned generally as a possible measuring system. For this purpose, by way of example, reflectors are fitted on the workpiece. In accordance with the description, the position of each reflector can be determined by means of a light source and a two-dimensional detector, such that the position and alignment of the workpiece can be detected by means of three such points. The exact construction of the measuring system is not described in greater detail in WO 2007/004983 A1.

U.S. Pat. No. 5,380,978 (Pryor) describes a method for positioning objects, in particular sheet metal parts, in space by means of an industrial robot. Inter alia, cameras having a corresponding stereo basis for the three-dimensional detection of the position of the object in space are used as a measuring system. The cameras are pivotable for adjusting the field of view and, in one specific embodiment, are designed as a theodolite camera, which can also have a laser distance measuring device. In this case, the theodolite described serves as a precise adjusting apparatus for the camera. Similar measuring systems are also described in U.S. Pat. No. 4,851,905 (Pryor) and U.S. Pat. No. 5,706,408 (Pryor).

US 2009/055024 A1 (Kay) describes a robot arm and control system wherein a fixedly aligned 3D scanning apparatus with a limited field of view is directed at a robot arm and at a target object. Both the robot arm and the target object have markings lying in the fixed fixed of view of the 3D scanning apparatus. The relative spatial position between the target object and the robot arm is detected by means of the 3D scanning apparatus. The robot arm is driven by means of the 3D scanning apparatus in such a way that the target object can be gripped by the robot arm. One disadvantage of the system described is that the limited, fixed field of view of the 3D scanning apparatus enables only a very limited distance between the robot arm and the target object, since the markings of both elements must always lie in the field of view. On account of the resultant requisite large field of view and the limited image resolution of a 3D scanning apparatus, only a limited positioning accuracy is possible, since the markings cannot be detected with sufficient accuracy. Since the method described only describes a relative adjustment of a robot arm—not gripping an object—in the direction of an object to be gripped and, consequently, only a relative positional detection of the markings with respect to one another needs to be carried out, it is not necessary to detect the absolute position and alignment of the 3D scanning apparatus in space. A referencing in the form of a determination of the position of the 3D scanning apparatus in the spatial coordinate system or a detection of the alignment in the spatial coordinate system is therefore obviated entirely.

EP 1 345 099 A2 (TECMEDIC) describes a method for determining a positional deviation of a workpiece gripped imprecisely by a gripper of a robot and for mounting the workpiece on an object by means of the robot, comprising a gripper, comprising an image processing system comprising sensors, such as cameras, and comprising a computer. A plurality of cameras which are stationary or are mounted on the robot arm and which are spaced apart from one another each have a fixed field of view, wherein the fields of view of the cameras overlap. Firstly, the position of a calibration object and of a calibration tool is detected. The workpiece is gripped imprecisely by the robot. The workpiece is moved into an actual lead position. From the positional deviation of the workpiece in the actual lead position from the desired lead position, which was determined beforehand with the aid of the calibration tool, an actual vector is calculated, representing the gripping error of the robot. On the basis of this actual vector, the transformations for adjusting the gripper are calculated, wherein the necessary relative movement between workpiece and object is calculated. The adjustment in accordance with the actual vector is effected solely by means of the robot positioning system, wherein it is assumed that the robot can position the workpiece with sufficient accuracy and robot faults are no longer significant. Since the field of view of the cameras is limited and not adjustable, the method can only be employed in a limited spatial region. Although a gripping error of the gripper is detected by means of the method, a possible imprecision in the robot positioning system is not detected. An ideal, very high robot accuracy is assumed. Moreover, the cameras have to be referenced by means of an external referencing system in a world coordinate system.

WO 2005/039836 (ISRA Vision) describes a method for effecting a movement of a handling device with at least one by means of a controller of an actuator. A movement sequence related to an optically detectable object is predetermined for the controller. A control command for the actuator of the handling device is calculated on the basis of the position and/or the movement state of the identified object and the movement sequence related to the object. A corresponding actuating command is output to the actuator to be moved. In other words, the handling device follows an object and is tracked thereto, wherein the object is neither gripped by the handling device nor positioned. The image recording is performed by a stationary camera, or a camera moved concomitantly with the handling device, with a fixed relative field of view.

What most of these systems and methods have in common is that the positions of a plurality of distinguished points on the object are determined by means of contactless photogrammetric coordinate measurements with the aid of image processing systems.

For contactless photogrammetric coordinate measurement at the surface of an object in the near range, from images which reproduce the object from different perspectives, by transforming the image data into an object coordinate system within which the object is to be measured and which is based on the CAD model of the object, for example, the dimensions of the object and the position thereof relative to further objects in the image are deduced. For this purpose, the image data are processed in a data processing unit. The basis of the coordinate calculation is the determination of the relative camera orientations of the images involved.

In this case, as known from the prior art, there is the possibility of recording in a temporally staggered manner from different perspectives that area section of the object surface which is to be measured, by means of a single camera, and of subsequently processing the respective two-dimensional image data by means of an image processing system to form a so-called three-dimensional image. In this case, the pixels of said three-dimensional image are respectively assigned items of depth information, such that each pixel to be examined, in particular all pixels, are assigned 3D image coordinates in an image coordinate system determined from the cameras and the perspectives thereof. Different image processing methods for generating such a three-dimensional image from a plurality of two-dimensional images showing the same scene from different perspectives are known from the prior art.

Furthermore, it is possible, as likewise known from the prior art, instead of the temporally staggered recording of the area section from different perspectives by means of one camera, to carry out substantially simultaneous recording with the aid of a plurality of cameras. This has the advantage that three-dimensional detection of the area section is possible without camera movement, and detection of the respective camera alignments is also obviated, since the cameras can have a fixed relative alignment and distance with respect to one another.

The prior art discloses different 3D image recording devices which are substantially composed of two or three cameras which, in a manner spaced apart from one another, that is to say having a stereo basis, are accommodated in a common housing in a manner fixedly coupled to one another for the purpose of recording a scene from respectively different, but fixed relative perspectives. Since the recorded area section does not necessarily have characteristic image features which enable the images to be processed electronically, markings can be applied on the area section. Said markings can be generated by means of a structured light beam, more particularly laser beam, which is projected onto the area section by the 3D image recording unit and which projects, for example, an optical raster or an optical marking cross. Such 3D image recording units regularly also comprise an image processing device, which derives a three-dimensional image from the plurality of substantially simultaneously recorded images of different perspectives.

Such 3D image recording units are, for example, the image recording systems from "CogniTens" that are known by the trade names "Optigo" and "OptiCell" and contain three cameras arranged in an isosceles triangle, and the system "Advent" from "ActiCM" comprising two high-resolution CCD cameras arranged alongside one another and also a projector for projecting structured light onto the section to be recorded.

The coordinates of recorded image elements to be measured are generally determined by means of referenced markings within the image, from which markings the actual 3D coordinate measurement takes place. In this case the image coordinate system which relates to the recorded three-dimensional image and is thus related to the 3D image recording unit is transformed into the object coordinate system within which the object is to be measured and which is based on the CAD model of the object, for example. The transformation takes place on the basis of recorded reference markings whose positions in the object coordinate system are known. Accuracies of below 0.5 mm are achieved in this case with the 3D image recording units known from the prior art.

Furthermore, 3D scanning systems in particular in the form of 3D scanners with electro-optical distance measurement are known, which carry out depth scanning within an area region and generate a point cloud. In this case, a distinction should be drawn between serial systems, in which a point-like measurement beam scans an area point by point, parallel systems, in which a line-like measurement beam scans an area line by line, and fully parallel systems, which scan a multiplicity of points within an area region simultaneously and thus carry out a depth recording of the area region. What all these systems generally have in common is that the depth scanning is effected by means of at least one distance measuring beam directed at the area and/or moved over the area. Primarily serial systems are in widespread use and commercially available for example under the product designations "Leica HDS 6000", "Leica ScanStation 2", "Trimble GX 3D Scanner", "Zoller+Fröhlich IMAGER 5003" and "Zoller+Fröhlich IMAGER 5006". Examples of further systems that may be mentioned include "3rdTech DeltaSphere-3000IR", "Basis Software Surphaser 25HSX", "Basis Software Surphaser 25HS", "Callidus precision systems CPW 8000", "Callidus precision systems CP 3200", "Faro Europe LS 420", "Faro Europe LS 880", "I-Site 4400-LR", "I-Site 4400-CR", "Optech ILRIS-3DER", "Optech ILRIS-3D", "Riegl Laser Measurement Systems LMS-Z420i/LMS-Z390i", "Riegl Laser Measurement Systems LPM-321" and "Trimble VX".

Moreover, RIM cameras exist, also called RIMs or Range Imaging Systems, which enable image recording of an object with simultaneous detection of an item of depth information for each pixel or for a group of pixels. Consequently, it is possible, by means of a single apparatus, to record a three-dimensional image in which each pixel or a multiplicity of pixel groups is assigned an item of depth information, that is to say distance information with respect to the camera.

A problem of every 3D image recording unit is the limited recording range—owing to design constraints—within which image recording can be effected with the required resolution. During the three-dimensional detection of relatively large objects, effecting a plurality of individual three-dimensional recordings from different positions and alignments of the 3D image recording unit is therefore unavoidable. This multiplicity of relatively small image recordings is subsequently joined together to form a larger three-dimensional overall image by means of compensation of overlapping image regions and with the aid of markings within the recorded area section. Different methods for solving this problem are known from the prior art. One general problem in these methods is that the individual three-dimensional images which are intended to be joined together to form a larger image have to have an overlap region. The discrete altering of the position of the 3D image recording unit from a first area section having at least one reference point to a second area section that is at a distance from the first area section and contains no reference point is not possible by means of the image processing systems if further images linking the two area sections were not recorded. It is therefore necessary to carry out a multiplicity of intermediate image recordings in order to optically link the two spaced-apart area sections to be measured and to enable continuous image processing. The recording of a multiplicity of three-dimensional images having no direct measurement content slows down the entire measurement method and takes up storage and computational resources. Furthermore, the coordinate measurements—which are inevitably beset by small measurement errors—within the image recording during the assembly of the multiplicity of images have a dramatic effect on the measurement accuracy, particularly in the case of distant reference points.

The use of a multiplicity of reference points having known positions in the object coordinate system is therefore unavoidable on account of the limited field of view of the cameras. One advantage of the purely photogrammetric systems described is that the absolute position and alignment of the individual cameras of the 3D image recording unit in the object coordinate system does not have to be determined because the absolute position determination of the recorded pixels is effected from the knowledge of the position of the likewise recorded reference points in the image, the relative alignment of the cameras with respect to one another and the relative positions—calculated by means of triangulation—of the points to be measured relative to the reference points in the image. The measurement system can thus be limited to image-calibrated cameras, the relative position of which with respect to one another is known, and an image processing device.

One disadvantage of all these systems is that, on account of the limited field of view of the cameras and the limited image resolution, adjustment of the field of view either by pivoting or altering the position of the cameras or of the object to be measured is often unavoidable. This is the case primarily when measuring relatively large objects to be measured highly precisely, since a specific distance between the cameras and the object must not be overshot on account of the limited image resolution in order to comply with the required measurement accuracy, but the field of view of the camera given such proximity to the object only permits part of the object to be recorded. Consequently, it is either necessary to use a multiplicity of reference points, such that, during each image recording, a corresponding number of reference points, preferably at least three reference points, lie in the field of view, or it is necessary to have recourse to the positions of object points already determined beforehand, in particular markings on the object.

In this case, as described above, a plurality of individual three-dimensional recordings from different positions and alignments of the 3D image recording unit are effected. This multiplicity of the relatively small image recordings is subsequently joined together to form a larger three-dimensional overall image by means of compensation of overlapping image regions and with the aid of markings within the recorded area section. This costs time and requires the use of markings that are not to be measured per se.

Furthermore, measuring systems and methods are known from the prior art in which the 3D image recording unit is carried by the head of an industrial robot or a portal coordinate measuring machine and is adjustable. On account of the high weight of a high-quality and high-resolution 3D image recording unit, which in some instances is greater than 10 kilograms, precise detection of the position of the 3D image recording unit with the required accuracy, which is equivalent to the image recording accuracy, is not possible since this would require such a stable construction of the handling system that the area of use of the 3D image recording unit would be limited to stationary systems. On account of their comparatively low measurement accuracy, which is considerably lower than that of a precise 3D image recording unit, industrial robots are unsuitable for external referencing. Portal coordinate measuring machines are in turn not designed for carrying heavy loads and, in the case of high mechanical loading, do not yield measurement results that can be used for referencing. For this reason, the position measurement values which are possibly supplied by the handling system and which might give information about the absolute and/or relative position of the 3D image recording unit cannot be utilized for referencing the image recordings, in particular a plurality of three-dimensional image recordings of different, non-contiguous area section.

Although the measuring systems described are also suitable for highly precisely positioning objects in space by means of handling systems and are also used for this purpose, the systems previously known from the prior art are beset by numerous disadvantages. On account of the above-described measuring method effected substantially purely by means of image processing, the methods require a relatively long time and necessitate detecting reference or auxiliary markings that are not to be measured per se. On account of the limited field of view of the cameras, the 3D image recording units are usually arranged in direct proximity to the process, generally on a robot arm or at a small distance from the object. Owing to the associated proximity to the process, the 3D image recording unit is exposed to possible particles and thermal influences which arise as a result of the process—for example during welding. Likewise on account of the proximity to the process, further handling systems have to be coordinated with the handling system of the 3D image recording unit in order to avoid collisions. Movement of the 3D image recording unit and the associated new referencing require a comparatively long time and slow down the entire process sequence. Consequently, an arrangement of the 3D image recording unit remote from the process has been entirely dispensed with hereto for.

The two aims, firstly using a highly precise, contactless 3D measuring system having an accuracy of preferably below 0.1 mm for highly precisely positioning objects by means of industrial robots, secondly a measuring system which is not directly exposed to the process, is flexible to handle, is intended to detect a largest possible action and movement space, and, in particular, can be positioned freely, therefore constitute a conflict of targets that has not been adequately resolved heretofor in the field of industrial object positioning by means of industrial robots.

SUMMARY

Therefore, the problem addressed by the invention is that of providing a method distinguished by flexibility, precision and high process speed and a corresponding system for highly precisely positioning at least one object in a position in space by means of an industrial robot.

This problem is solved by the realization of the features of the independent claims. Features which develop the invention in an alternative or advantageous manner can be gathered from the dependent patent claims.

The method according to the invention will firstly be described generally. Possible and preferred developments of the invention will then be explained generally with the aid of the figures showing schematically illustrated exemplary embodiments.

The method for highly precisely positioning at least one object in an end position in space is carried out by means of an industrial robot and an optical 3D image recording device. The first industrial robot is adjustable to predeterminable positions. It is internally calibrated and also calibrated in the three-dimensional spatial coordinate system and referred thereto. The optical 3D image recording device, which is calibrated in a three-dimensional spatial coordinate system and is positioned in a known position with a known alignment, is designed for electronically recording three-dimensional images within a specific field of view, wherein the three-dimensional images are in each case composed of a multiplicity of pixels which are each assigned an item of depth information. The optical 3D image recording device has a drive unit for the alignment—which brings about adjustment of the field of view—of the 3D image recording device. Moreover, the optical 3D image recording device has an angle measuring unit calibrated in the spatial coordinate system and serving for highly precisely detecting the angular alignment of the 3D image recording device, such that it is possible to determine the field of view in the spatial coordinate system.

The method comprises the following steps:

A first object, which has known optically detectable first features, is gripped and held by the first industrial robot within a gripping tolerance.

A first compensation variable—correcting the gripping tolerance—for the first industrial robot is determined such that the first object is adjustable in a compensated fashion in the spatial coordinate system by predetermining a position of the first industrial robot. The first compensation variable is determined by the following steps: aligning the field of view of the 3D image recording device by means of the drive unit with at least one portion of the first features of the first object held in a first compensation position of the first industrial robot. Recording at least one first three-dimensional image. Determining the position of the first object in the spatial coordinate system in the first compensation position of the first industrial robot from the position of the 3D image recording device, the angular alignment of the 3D image recording device, said angular alignment being detected by the angle measuring unit, the first three-dimensional image, and the knowledge of the first features on the first object. Determining the first compensation variable by utilizing the first compensation position of the first industrial robot, and at least the determined position of the first object in the first compensation position of the first industrial robot.

The first object is highly precisely adjusted to a first end position by the following steps, which are repeated until the first end position is reached in a predetermined tolerance: recording at least one further first three-dimensional image using the 3D image recording device. Determining the present position of the first object in the spatial coordinate system from the position of the 3D image recording device, the angular alignment of the 3D image recording device, said angular alignment being detected by the angle measuring unit, the further first three-dimensional image, and the knowledge of the first features on the first object. Calculating the position difference between the present position of the first object and the first end position. Calculating a new desired position of the first industrial robot taking account of the first compensation variable from the present position of the first industrial robot, and a variable which is linked to the position difference, and adjusting the first industrial robot to the new desired position.

The system according to the invention for highly precisely positioning at least one object in an end position in space by means of an industrial robot comprises a first industrial robot, an optical 3D image recording device and a control apparatus. The first industrial robot is calibrated in such a way that it is adjustable to predeterminable positions. For this purpose, the industrial robot is internally calibrated and referred to the spatial coordinate system. The optical 3D image recording device, which is calibrated in a three-dimensional spatial coordinate system and is positioned in a known position with a known alignment, is is designed for electronically recording three-dimensional images within a specific field of view, wherein the three-dimensional images are in each case composed of a multiplicity of pixels which are each assigned an item of depth information. The optical 3D image recording device has a drive unit for the alignment—which brings about adjustment of the field of view—of the 3D image recording device, and has an angle measuring unit calibrated in the spatial coordinate system and serving for highly precisely detecting the angular alignment of the 3D image recording device, such that it is possible to determine the field of view in the spatial coordinate system. The control apparatus has a data processing device designed for image processing. The control apparatus has a data connection to the first industrial robot and the optical 3D image recording device in such a way that the three-dimensional images recorded by the optical 3D image recording device are fed to the control apparatus, the angular alignment of the 3D image recording device, said angular alignment being detected by the angle measuring unit, is fed to the control apparatus, the drive unit is driven for aligning the 3D image recording device by means of the control apparatus, and the first industrial robot is adjusted in positions that are predetermined by the control apparatus.

The control apparatus and the data processing device thereof are designed and have data connection to said components in such a way that the following steps are executed by signal recording, signal evaluation, signal calculation and signal outputting:

A first object, which has optically detectable first features known to the control apparatus, is gripped and held by the first industrial robot within a gripping tolerance.

A first compensation variable—correcting the gripping tolerance—for the first industrial robot is determined by the control apparatus such that the first object is adjustable in a compensated fashion in the spatial coordinate system by predetermining a position of the first industrial robot. This first compensation variable is determined by means of the control apparatus by the steps of: aligning the field of view of the 3D image recording device by means of the drive unit with at least one portion of the first features of the first object held in a first compensation position of the first industrial robot. Recording at least one first three-dimensional image. Determining the position of the first object in the spatial coordinate system in the first compensation position of the first industrial robot from the position of the 3D image recording device, the angular alignment of the 3D image recording device, said angular alignment being detected by the angle measuring unit, the first three-dimensional image, and the knowledge of the first features on the first object. Determining the first compensation variable by utilizing the first compensation position of the first industrial robot and at least the determined position of the first object in the first compensation position of the first industrial robot.

The first object is highly precisely adjusted by the control apparatus to a first end position by the following steps, which are repeated until the first end position is reached in a predetermined tolerance: recording at least one further first three-dimensional image. Determining the present position of the first object in the spatial coordinate system from the position of the 3D image recording device, the angular alignment of the 3D image recording device, said angular alignment being detected by the angle measuring unit, the further first three-dimensional image, and the knowledge of the first features on the first object. Calculating the position difference between the present position of the first object and the first end position. Calculating a new desired position of the first industrial robot taking account of the first compensation variable from the present position of the first industrial robot, and a variable which is linked to the position difference. Adjusting the first industrial robot to the new desired position.

BRIEF DESCRIPTION OF THE DRAWINGS

The method according to the invention and the system according to the invention are described below on the basis of schematically illustrated exemplary embodiments.

Specifically:

FIG. 1a shows the method and system according to the invention with an optical 3D image recording device for positioning a first object;

DETAILED DESCRIPTION

Figure 1B:
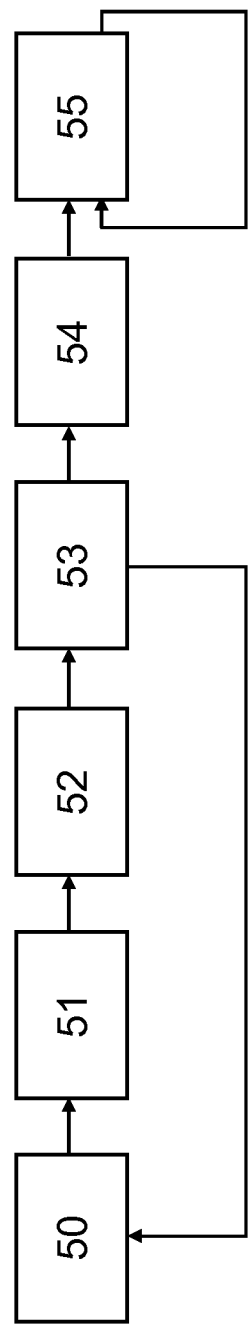
FIG. 1b shows a flowchart of the method sequence.

FIG. 1a shows a first embodiment of the system and method sequence for highly precisely positioning a first object in a first end position in space. The method steps are illustrated in FIG. 1b. FIGS. 1a and 1b are explained jointly.

The method according to the invention serves for highly precisely positioning at least one object in an end position in space by means of at least one industrial robot. The end position in space is a position and alignment which the object has to assume highly precisely—more particularly with an accuracy of below 0.5 mm, preferably below 0.2 mm, specifically below 0.1 mm. The end position is generally understood to mean that position and alignment of the object to which the object is intended to be brought in the context of the method. It goes without saying that the object can subsequently be brought to one or any desired number of further, new end positions.

The method components comprise a first industrial robot 11 and an optical 3D image recording device 1. A control apparatus 9 is furthermore provided for carrying out the method by means of the system.

The first industrial robot 11 is designed for gripping a first object 12. By way of example the industrial robot 11 is an articulated-arm robot having a gripper 11a, which is adjustable within six degrees of freedom. The gripper 11a is embodied as a pneumatic gripper, for example for gripping a piece of sheet metal. However, the gripper can also be a mechanical gripper, in particular pincer gripper, or other gripper for mechanically coupling an adjustable element of the industrial robot 11. The gripper 11a is adjustable to predeterminable positions by means of a desired position of the gripper 11a being predetermined for the industrial robot 11. For this purpose, the industrial robot 11 has internal measuring, regulating and coordinate transformation systems. An industrial robot 11 should generally be understood to mean a handling system, as described in the introduction, which is suitable for gripping and positioning an object.

The optical 3D image recording device 1 is calibrated in a three-dimensional spatial coordinate system and is positioned in a position P with a known alignment. The detection of the position P is explained below. Consequently, both the position and the angular alignment are known indirectly or directly in that coordinate system in which the first object 12 is actually to be positioned. The 3D image recording device 1 is designed for electronically recording three-dimensional images within a specific field of view, wherein the three-dimensional images are in each case composed of a multiplicity of pixels that are each assigned an item of depth information. The 3D image recording device 1 is optically calibrated, such that optical measurements in the image recording can be effected within the field of view 8.

An optical 3D image recording device should generally be understood to mean an electronic apparatus for recording optically detectable points with respective depth information, wherein the optical 3D image recording device has the requisite equipment, more particularly a lens and corresponding image recording elements, more particularly a CCD or CMOS image sensor, a distance measuring unit and a corresponding electronic unit. The lens can be any desired lens, for example a fixed focus lens, a zoom lens or a varifocal lens, more particularly with motor zoom and autofocus. The optical 3D image recording device is internally calibrated, such that possible faults particularly in the optical system, the image sensor or the electronic unit, for example distortions, etc., can be taken into account and compensated for. The optical 3D image recording device is thus suitable for photogrammetric measurement.

Moreover, the optical 3D image recording device 1 has at least one drive unit 3 for the alignment—which brings about adjustment of the field of view 8—of the optical 3D image recording device. By way of example, the drive unit 3 is a pivoting unit for pivoting the optical 3D image recording device about two pivoting axes. In one possible but not necessary embodiment variant, said pivoting axes can be a horizontal tilting axis H with respect to the spatial coordinate system and a vertical axis V.

Furthermore, the optical 3D image recording device 1 has an angle measuring unit 4 calibrated in the spatial coordinate system and serving for highly precisely detecting the angular alignment of the optical 3D image recording device, such that the field of view 8 can be determined in the spatial coordinate system. On account of the internal calibration—relating to the optical recording unit and the angle measuring unit—of the optical 3D image recording device 1 and also the external referencing of the optical 3D image recording device 1 in the spatial coordinate system, each pixel defines highly precisely a point in the spatial coordinate system which results firstly from the position of the pixel on the image sensor, that is to say the two-dimensional image recording, secondly from the depth information assigned to this pixel, from which the three-dimensional image results, thirdly from the alignment of the optical 3D image recording device 1, said alignment being detected by means of the angle measuring unit 4, and fourthly from the known position of the optical 3D image recording device 1 and fifthly from the respective calibration parameters.

In the exemplary embodiment shown, the angle measuring unit 4 in each case detects the horizontal angular alignment α about the vertical axis V and the vertical angular alignment β about the tilting axis H in the spatial coordinate system. The horizontal tilting axis H and the vertical axis V substantially intersect. Consequently, the optical 3D image recording device 1 is embodied as a type of 3D video theodolite, wherein this should be understood to mean a theodolite with a 3D image recording apparatus, which is either linked coaxially into the theodolite or is arranged non-coaxially in particular on the telescope of the theodolite.

The optical 3D image recording device 1 references and calibrates itself by means of its own measuring system in space, such that the position P and external calibration parameters are determined by means of the 3D image recording device 1.

The position P of the optical 3D image recording device 1 in the spatial coordinate system is determined by aiming at stationary target marks T by means of the 3D image recording device 1. The stationary target marks T and the known optically detectable first features 13 of the first object 12 are preferably spaced apart in such a way that aiming at the stationary target marks T and recording the at least one first three-dimensional image are effected with different alignments of the field of view 8 of the 3D image recording device 1. In other words, it is necessary to alter the alignment of the field of view 8 of the 3D image recording device 1 after the detection of the position P by aiming at the stationary target marks T and before recording the first features 13 on the first object 12, since the limited field of view 8 does not allow simultaneous recording both of the target marks T and of the first features 13 on the first object 12, as shown in FIG. 1. Aiming at the stationary target marks T by means of the 3D image recording device 1 should be understood to mean that the target marks T lie in the field of view 8 of the 3D image recording device 1 and the position of the pixels which are assigned to the target marks T can be detected, or that the position of the targets marks T are determined by means of an ancillary unit, for example an electro-optical distance measuring device 5, of the 3D image recording device 1.

The control apparatus 9 has a data processing device designed for image processing. The control apparatus 9 has a data connection at least to the first industrial robot 11 and the optical 3D image recording device 1. The three-dimensional images recorded by the optical 3D image recording device 1 for carrying out the image processing are fed to the control apparatus 9. Furthermore, the control apparatus 9 receives the angular alignments of the 3D image recording device 1, said angular alignments being detected by the angle measuring unit 4, as input signal. The drive unit 3 is driven by means of the control apparatus 9 for aligning the 3D image recording device 1. The first industrial robot 11 can be adjusted to positions that are predetermined by the control apparatus 9. The requisite data connection can be effected by means of voltage signals, radio signals, optical signals or other communication paths. The reference and calibration parameters, in particular the individual positions, alignments and dimensions of the components involved, are—in so far as is necessary for carrying out the method—stored in the control apparatus 9. The control apparatus 9 can be a unit, for example a personal computer having suitable interfaces, and also a plurality of intercommunicating or internetworked, locally separate individual components which, for example, are part of individual apparatuses. In particular, it is possible for the control apparatus 9, which should be understood in an abstract manner, to be part of the 3D image recording device 1 and/or of the first industrial robot 11.

The first object 12, which is intended to be positioned in the end position in space, has known optically detectable first features 13. Said first features 13 can be any desired features which can be detected by means of the optical 3D image recording device 1. The term "optically detectable" should therefore be understood to mean detectability by the optical 3D image recording device 1, and not necessarily visibility to the human eye.

The optically detectable features can be formed by features of the object, in particular its form, surface course and surface constitution, for example corners, edges, holes, cutouts and beads. Alternatively or additionally, the features can be fitted on the object, for example in the form of adhesive or color markings. Preferably, the features extend in at least two dimensions, for example in the form of three points which do not lie on a straight line. The features are such that the position determinations thereof define the position, that is to say the position and alignment of the object in space, as unambiguously as possible.

The object 12 is any desired object which is to be positioned highly precisely in space and which can be gripped and held by the first industrial robot 11, for example a sheet metal part.

The method sequence according to the invention is described below, reference also being made to FIG. 1b, which illustrates the method sequence in the form of a flowchart.

In step 50, the first object 12, which is situated for example in a storage position, is gripped and held by the first industrial robot 11 by means of the gripper 11a thereof within a gripping tolerance. The gripping tolerance lies above the tolerance within which the first object 12 is intended to be positioned in the end position. Particularly pneumatic grippers without constrained centering with respect to the object do not allow highly precise gripping, and so the relative position of the object with respect to the gripper has a tolerance that is to be compensated for, that is to say corrected.

In optional step 51, which is effected in one development of the invention, the first industrial robot 11, holding the first object 12 with the unknown gripping error, is adjusted to a first compensation position for determining a first compensation variable. In this compensation position of the first industrial robot 11, the first object 12 is readily visible to the optical 3D image recording device 1 for three-dimensional image recording. If this visibility is already ensured after gripping and the first object 12 is already situated in a position, this step 51 can also be omitted.

In the subsequent step 52, a first compensation variable is determined in order to correct said gripping tolerance. This first compensation variable correcting the gripping tolerance for the first industrial robot 11 serves the purpose that the first object 12 is adjustable in a compensated manner in the spatial coordinate system by predetermining a position of the first industrial robot 11. Compensated adjustment should be understood to mean that when predetermining the position which the gripper 11a of the robot is intended to assume, the gripping error with which the part was gripped is corrected. The gripping error is therefore taken into account by a correction variable, the first compensation variable. The gripping error can occur in all six degrees of freedom, such that the compensation variable can assume corresponding values in particular in the form of a tensor. In the ideal case, that is to say upon exact gripping of the first object by the gripper 11a, the compensation variable would be equal to zero.

The first compensation variable is determined by means of the following substeps. Firstly, the optical 3D image recording device 1 is aligned, in particular pivoted, by means of the drive unit 3 with respect to at least one portion of the first features 13 of the first object 12 held in the first compensation position of the first industrial robot 11. Preferably, at least three points forming the first features 13 are situated in the field of view 8. A first three-dimensional image is then recorded by means of the optical 3D image recording device 1. From this three-dimensional image, subsequently the position of the first object 12 held in the first compensation position of the first industrial robot 11 is determined in the spatial coordinate system. This position determination is already possible as a result of determining the position of three distinguished points. The position of the first object 12 is firstly determined from the knowledge of the position P of the optical 3D image recording device 1, the angular alignment of the optical 3D image recording device 1, said angular alignment being detected by the angle measuring unit 4, and the first three-dimensional image. By means of these items of information, it is already possible to determine the position of individual detected points in the spatial coordinate system in particular by image processing in the control apparatus 9. In order to derive the position of the object therefrom, it is additionally necessary to have knowledge of the first features 13 on the first object 12 in order to be able to deduce the position of the first object in space from the position of the first features 13. If it is known from an electronic model, for example, that and at what location a sheet metal part has specific holes, then the position of the object can be deduced from the position of said holes. The first compensation variable is then determined by utilizing the first compensation position of the first industrial robot 11, which yields the ideal position in the case of fault-free gripping, and at least the determined, that is to say actual position of the first object 12 in the first compensation position of the first industrial robot 11.

In one development of the invention, the features 13 of the object 11 are substantially known from a model that can be processed by the electronic data processing device of the control apparatus 9. This can involve an electronic model obtained by means of CAD. By means of image processing executed on the electronic data processing device, the features 13 in the model and/or in the image recordings are identified and these features 13 from the model and also the features 13 from the image recordings are assigned to one another. The position of the object 12 in the spatial coordinate system is determined from the detected position of the recorded features 13 in the spatial coordinate system and the assigned features 13. Such image processing and feature identification methods are known from the prior art and need not be explained in any further detail at this juncture.

Since it is now known with what error the first object 12 was gripped and a corresponding first compensation variable was determined, it is now possible to position the first object 12 by means of the first industrial robot 11 within the scope of the measuring accuracy of the sensors of the first industrial robot 11. This measurement accuracy is not sufficient, however, for which reason it is necessary to solve a further positioning problem.

For example on account of manufacturing tolerances and ambient parameters, it is possible that the first object 11, for example a sheet metal part, itself is subject to a specific tolerance in dimensioning and form which has to be taken into account. For this reason, in one development, the invention provides for taking account of variations of the first object.

In one development of the invention in accordance with optional step 53, the relative position of the recorded features 13 with respect to one another is determined and compared with the relative position of the features substantially known from the abovementioned model with respect to one another. In one variant of the invention, a fault message is output when a deviation between the relative position of the recorded features 13 and the relative position of the features substantially known from the model is exceeded. In the case of the fault message, in one development of the invention, the object 12 is exchanged for a new object 12, such that the method is continued with step 50, as shown by way of example in FIG. 1b. Alternatively, the model is adapted to the object 12 detected. It is thus possible for the model obtained by means of CAD, for example, to be adapted to the actual dimensions of the gripped object 12. This adapted model in this case determines the end position which the object 12 is intended to assume in the spatial coordinate system. If the end position is determined for example by a partial section of the object 12, in particular an edge, which has to assume the end position, then a deformation of the part is correspondingly taken into account by adaptation of the model.

In step 54, which is likewise optional, the first industrial robot 11, taking account of the first compensation variable, is adjusted from the first compensation position to a position in which the first object 12 is positioned in a first approximation position near the first end position. This is done by predetermining for the first industrial robot 11, for which the first compensation position had previously been predetermined, a new position as input variable, in which the first object 12 is situated in the first approximation position. The field of view 8 of the 3D image recording device 1 is aligned by means of the drive unit 3 with at least one portion of the first features 13 of the first object 12, which is now positioned in the first approximation position.

In step 55, the first object 12 is highly precisely adjusted to the first end position. For this purpose, the following steps are repeated until the first end position is reached in a predetermined tolerance. Firstly, at least one further first three-dimensional image is recorded by means of the 3D image recording device 1. The present position of the first object 12 in the spatial coordinate system is determined once again from the position P of the 3D image recording device 1, the angular alignment of the 3D image recording device 1, said angular alignment being detected by the angle measuring unit 4, the further first three-dimensional image and the knowledge of the first features 13 on the first object 12. The present position is then compared with the desired position, that is to say the first end position. The position difference between the present position of the first object 12 and the first end position is calculated. A new desired position of the first industrial robot 11 is thereupon calculated. This is done taking account of the first compensation variable from the present position of the first industrial robot 11 and a variable linked to the position difference. The variable linked to the position difference is preferably the position difference multiplied by a factor of less than or equal to 1. This means that the new desired position is a position of the industrial robot 11 in which the first object 12 will be situated in a position between the present position and the first end position. If the factor is equal to 1, the new desired position is a position in which the first object 12 is brought approximately from the present position to the first end position, in so far as this is possible by means of the relatively imprecise sensor system and actuator system of the industrial robot 11. However, since the latter is regularly too inaccurate to bring the first object 12 to the first end position in the predetermined tolerance by means of only one step 55, the factor is preferably less than 1, preferably less than 0.95, in particular less than 0.9, for example less than 0.8, but preferably greater than 0. By means of a factor that is less than 1 but greater than 0, the new desired position of the industrial robot 11 is such that after the industrial robot 11 has been adjusted to the new desired position, the first object 12 has approached the first end position but has not yet fully reached the latter.

The first industrial robot 11 is subsequently adjusted by predetermining the new desired position. In other words, the first industrial robot receives a new position input variable, from which its new desired position results. This new desired position is therefore moved to by means of the sensor system and actuator system of the first industrial robot 11. The steps mentioned are subsequently repeated. Therefore, once again at least one further first three-dimensional image is recorded, on the basis of which the present position of the first object 12 is determined and the position difference between the present position of the first object 12 and the first end position is calculated. If the first object again does not lie within the required tolerance of the first end position, once again a new desired position is predetermined for the first industrial robot 11, said desired position being calculated from its present position and the variable linked to the position difference, taking account of the first compensation variable. These steps are repeated until the first object 12 has reached the first end position highly precisely within the tolerance.

One essential advantage of the method described is that the position of the object in space can be detected by means of a very small number of three-dimension image recordings which, apart from the features of the object, do not have to exhibit further reference marks, as a result of which the method is considerably accelerated. After the adjustment of the field of view of the 3D image recording device, the photogrammetric image evaluation can be effected without new referencing. This is of importance particularly in industrial applications in which objects are moved by handling systems over relatively large distances and are subsequently positioned precisely, since changing the field of view in the form of pivoting the 3D image recording device at the features of the objects requires neither renewed referencing nor resorting to previously measured images and/or reference markings. Fast, highly precise and process-reliable positioning is thus ensured. Since the pivoting of the 3D image recording device does not lead to a loss of time on account of new referencing or coupling orientation, the recording devices can be arranged at a distance from the process, more particularly at a distance of 2 to 5 meters, such that the process is not adversely affected and the measurement technology is not directly exposed to the process. This is advantageous particularly in the case of welding methods, since the sensitive measurement technology is hardly influenced.

In one possible embodiment, the 3D image recording device 1 is designed in such a way that at least one first camera 2a can be aligned by means of the drive unit 3 about in each case a horizontal tilting axis H with respect to the spatial coordinate system and a vertical axis V. The angle measuring unit 4 can in each case detect the horizontal angular alignment α about the vertical axis V and the vertical angular alignment β about the tilting axis H in the spatial coordinate system. In particular, the horizontal tilting axis H and the vertical axis V substantially intersect. By means of the first camera 2a, it is possible to record a two-dimensional image composed of a multiplicity of pixels. In order to assign an item of depth information to all these pixels or at least groups of pixels, which should likewise be understood to mean a pixel in a simplified fashion, and to derive the three-dimensional image from the two-dimensional image, there are various possibilities, which will be described below.

In one variant, the 3D image recording device 1 has an electro-optical distance measuring device 5. Depending on the type of electro-optical distance measuring device 5, its measurement beam can be aligned relative to the first camera 2a and its relative angular alignment with respect to the first camera 2a can be detected highly precisely. The three-dimensional image is generated by detecting the items of depth information and by assigning the items of depth information to the multiplicity of pixels. In this case, the items of depth information are detected by an optical depth measurement on sections of the object 12 that correspond to the pixels by means of the electro-optical distance measuring device 5 and, in particular, the respective relative angular alignment of the measurement beam with respect to the first camera 2a. A laser scanner can be used for detecting the depth information.

By way of example, the electro-optical distance measuring device 5 is embodied as a point scanner. The items of depth information are detected by serial scanning by means of the point scanner, wherein at least one point-like measurement beam optically scans point by point, for example line by line, an area of the object 12 that corresponds to the field of view 8.

Alternatively, the electro-optical distance measuring device 5 is embodied as a line scanner. The items of depth information are detected by parallel scanning by means of the line scanner, wherein at least one line-like measurement beam optically scans line by line an area of the object 12 that corresponds to the field of view 8.

Moreover, there is the possibility of embodying the electro-optical distance measuring device 5 as an area depth measuring device, also called an area scanner. The items of depth information are detected by fully parallel scanning by means of the area depth measuring device, wherein at least one aerial measurement beam, which is formed, in particular, by a bundle of a multiplicity of measurement beams, optically scans area by area an area of the object 12 that corresponds to the field of view 8. The optical area depth measuring device thus scans the entire area of the field of view 8 of the 3D image recording device 1 in particular in a fully parallel fashion and substantially simultaneously. The three-dimensional image is generated by detecting the items of depth information by means of the optical area depth measuring device by means of the fully parallel depth measurement and by assigning the items of depth information to the multiplicity of pixels. The items of depth information which can be assigned to the pixels are thus obtained by means of an aerial depth recording of the area of the object 12 that corresponds to the field of view 8.

Such point, line and area scanners for serial and parallel and fully parallel scanning, respectively, are known from the prior art, as described above. Preferably, the electro-optical distance measuring device 5 and the first camera $2_a$ are coupled to one another and adjustable jointly by means of the drive unit 3. In particular, they form a common unit.

It is alternatively or additionally possible for the first camera $2_a$ of the 3D image recording device 1 to be embodied as an RIM camera for directly recording the three-dimensional image. The first camera $2_a$ is therefore itself embodied in such a way that each pixel or a multiplicity of groups of pixels can be assigned an item of depth information.

Such, more particularly propagation-time-based, range imaging (RIM) cameras have already been commercially available for a few years. In an RIM camera, a signal emitter emits modulated radiation. The modulation types used in this case are generally based on the principle of amplitude modulation in the case of the present sensors. Part of the emitted radiation is reflected in the object space and is partly imaged by an upstream optical system on a specific image sensor. The special feature of this image sensor is that each individual pixel is able to demodulate the received radiation, i.e. in particular to determine the phase angle or the propagation time of the signal. As an example of such RIM cameras, mention may be made of the SwissRanger SR-2 and Swiss-Ranger SR-3000 from CSEM (Switzerland) and the model 3k-S from PMD Technologies (Germany). SwissRanger has a combined CCD/CMOS sensor. The distance measurement is based on the phase difference method, wherein the unambiguity range extends as far as 7.5 meters. In this case, the signal reflected from the object is imaged via the optical system onto the respective pixel of the sensor, the associated distance calculation is carried out and the result of the measurement is then a distance image. The sensor has a size of 124×160 pixels (SR-2) or 176×144 pixels (SR-3000). Moreover, there exist RIM cameras having an implementation of single photon avalanche diodes (SPAD) in CMOS image sensors. The direct propagation time measurement method is thereby realized, with which the distance measurement is reduced to a propagation time measurement. In the known RIM cameras, the demodulation of the received radiation is regularly accomplished by means of indirect propagation time measurement, in particular by means of four sequential intensity measurements. In this case, in each pixel, the sinusoidal, amplitude-modulated wave is reconstructed with the aid of four integrating intensity measurements shifted by 90°. From these four measurements it is possible to calculate the phase angle and thus the distance covered. On account of the geometrical relationships in the camera system, a three-dimensional coordinate can then be calculated for each pixel from the pixel coordinates and the distance. On account of the simultaneity of the distance measurement in all pixels, a corresponding 3D model can be derived with each image.

In a further variant, as shown in FIG. 1a, the 3D image recording device 1 has a second camera $2_b$, which is coupled to the first camera 2a in such a way—more particularly within a common housing—and which is arranged at a distance from the first camera $2_a$ in such a way that the at least partly overlapping fields of view of the cameras $2_a$, $2_b$ form the field of view 8 of the 3D image recording device 1 in their overlap region. The three-dimensional image in the field of view 8 of the 3D image recording device 1 is generated from the knowledge of the relative perspectives of the cameras $2_a$, $2_b$ with respect to one another by means of image processing. Such 3D image recording units are, for example, the image recording systems from "CogniTens" that are known by the trade names "Optigo" and "OptiCell" and contain three cameras arranged in an isosceles triangle, and the system "Advent" from "ActiCM" comprising two high-resolution CCD cameras arranged alongside one another and also a projector for projecting structured light onto the section to be recorded.

The positioning method presented above was described for freely positioning an individual first object in space. However, it is furthermore possible to position at least one second object with the aid of the methods and components already described and/or to highly precisely align the first object relative to the second object, and vice versa. Such methods are described below. It is likewise possible to realize combination of the above-described features also with the positioning of the second object and any further object. For simpler illustration, however, a description of the developments possible in the case of the positioning of the first object also for the positioning of the further objects will be dispensed with. However, these combinations are likewise part of this invention.

Figure 2:
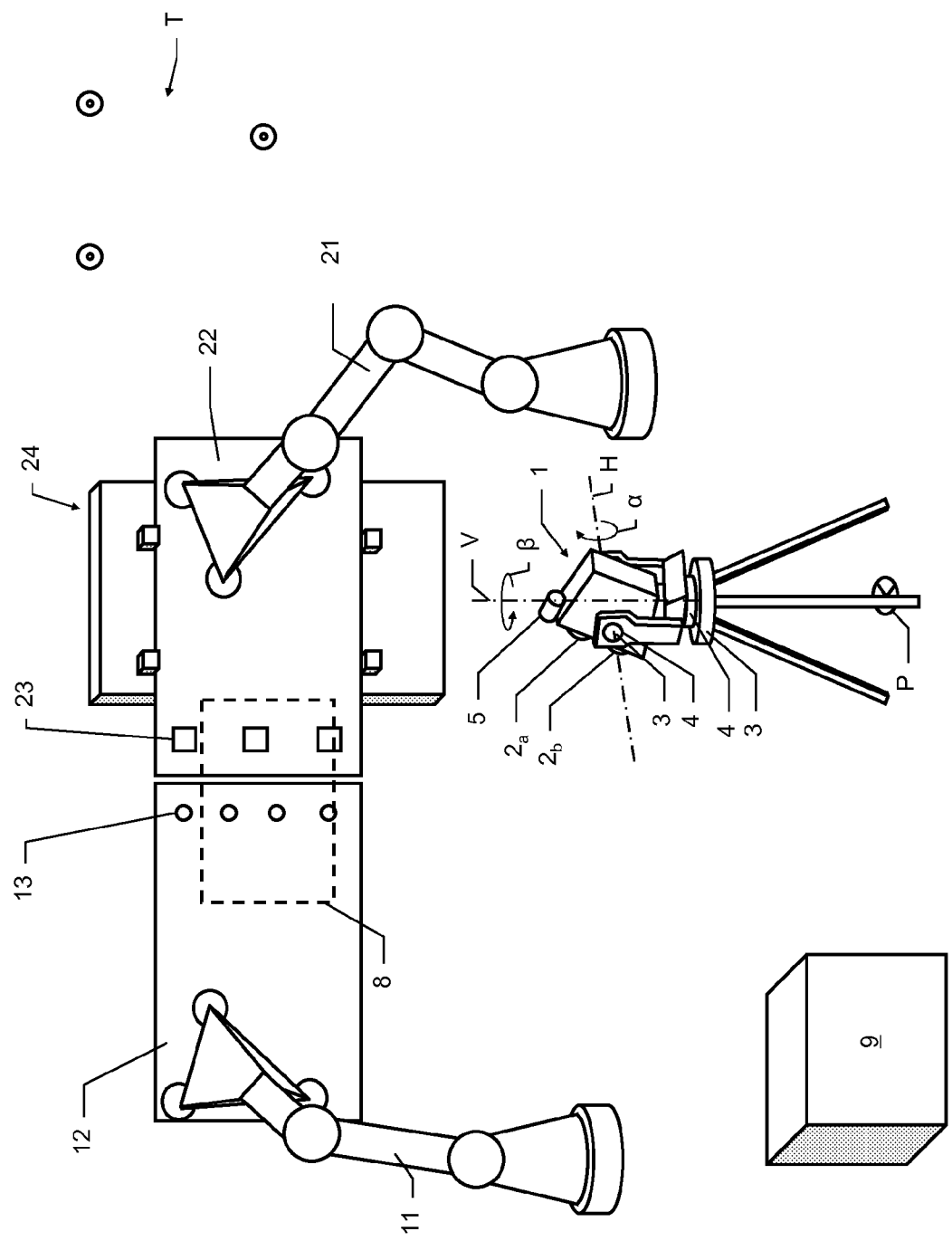
FIG. 2 shows the method and system with two industrial robots for positioning a first and second object.

One such development is shown in FIG. 2. Alongside the essential components of the embodiment from FIG. 1a, which will not be discussed again here, a second industrial robot 21 and an object mount 24 are provided. Before the first object 12 is highly precisely adjusted to the first end position, as described above, a second object 22 is gripped by the second industrial robot 21 and positioned into the object mount 24. The object mount 24 is embodied as a so-called "fixture", which can receive the second object 22. For this purpose, it is possible for the object mount 24 to have a corresponding form—for example for avoiding deformation of the object—and/or to have corresponding clamping apparatuses for fixing the object. After positioning in the object mount 24, the second object 22 is situated in a second end position in the spatial coordinate system. Alternatively, it is possible for the second object to be positioned in the object mount 24 manually rather than by means of a second industrial robot 21. In one embodiment variant, the object mount 24 is embodied with constrained centering in such a way that the second object 22 is highly precisely positioned in the predetermined second end position. Detection of the second end position by means of measurement technology can be obviated in this case. If this is not the case, however, then the second end position is determined in the spatial coordinate system. For this purpose, the second object 22 has known optically detectable second features 23. After the positioning of the second object 22 in the object mount 24, the second end position of the second object 22 is determined in the spatial coordinate system by firstly the field of view 8 of the 3D image recording device 1 being aligned by means of the drive unit 3 with at least one portion of the second features 23 of the second object 22. A second three-dimensional image is recorded. The second end position of the second object 22 in the spatial coordinate system is then determined from the position P of the 3D image recording device 1, the angular alignments of the 3D image recording device 1, said angular alignments being detected by the angle measuring unit 4, the second three-dimensional image and the knowledge of the second features 23 on the second object 22.

Alternatively, before the first object 12 is highly precisely adjusted to the first end position, the second object 22 is gripped by the second industrial robot 21 within a gripping tolerance and is not placed into the object mount 24, but rather held. The second industrial robot 21 is adjusted to an end position of the second industrial robot 21, in which the second object 22 is situated in the second end position. The second end position of the second object 22 is determined in the spatial coordinate system by means of the following steps: aligning the field of view 8 of the 3D image recording device 1 by means of the drive unit 3 with at least one portion of the second features 23 of the second object 22. Recording at least one second three-dimensional image. Determining the second end position of the second object 22 in the spatial coordinate system from the position P of the 3D image recording device 1, the angular alignment of the 3D image recording device 1, said angular alignment being detected by the angle measuring unit 4, the second three-dimensional image and the knowledge of the second features 23 on the second object 22.

In these cases in FIG. 2, the first end position for the first object 12 is calculated from the second end position of the second object 22 and a predetermined relative position between the first object 12 and the second object 22. Since the first object 12 is highly precisely positioned relative to the second object 22, a joining method, for example, can then be carried out for precisely connecting the two objects.

Figure 3:
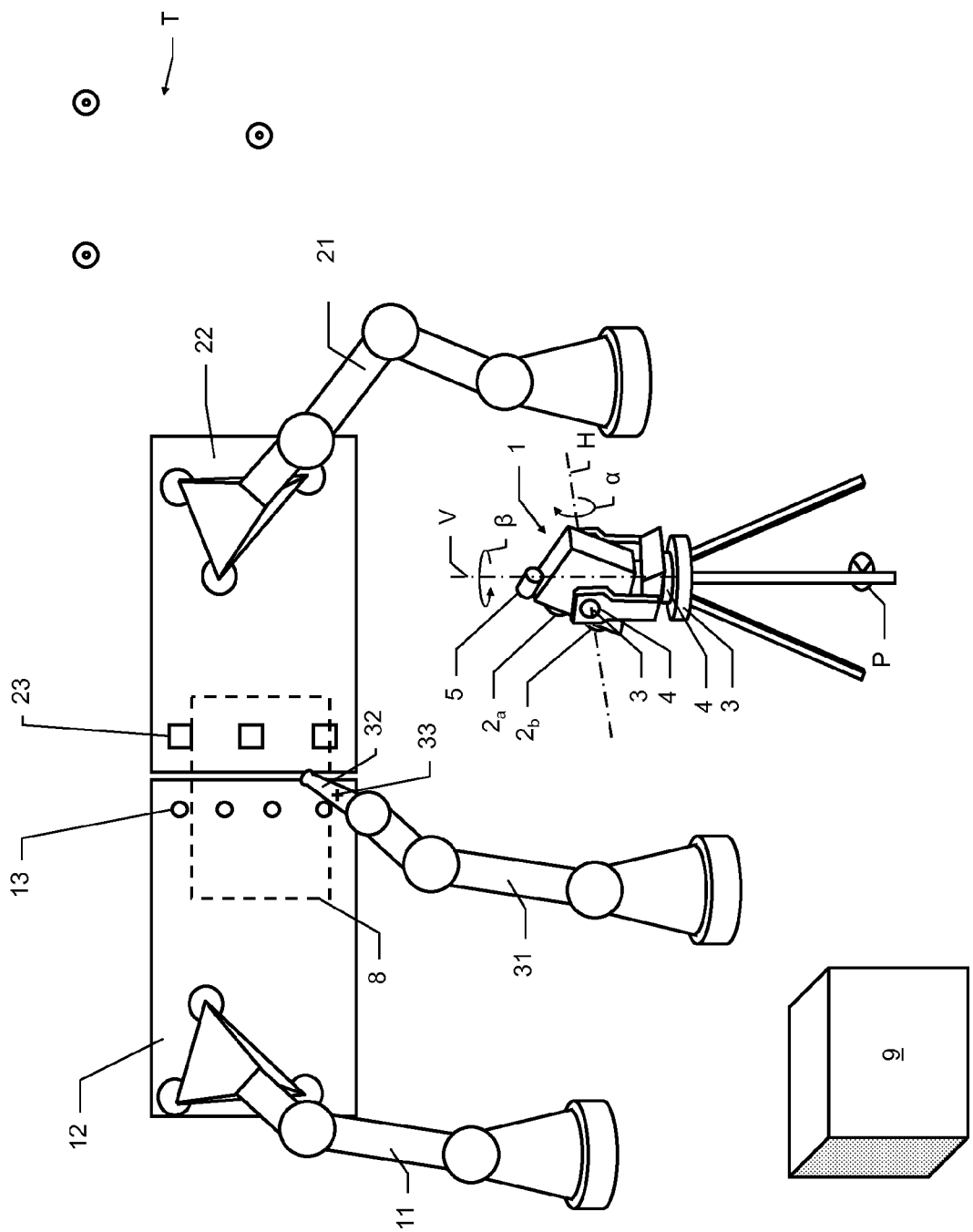
FIG. 3 shows the method and system with three industrial robots for positioning a first and second object and a processing tool.

FIG. 3 shows a further embodiment of the invention, wherein a second object 22 and a third object 32, which is embodied as a processing tool, are adjusted highly precisely.

The second object 22, which has known optically detectable second features 23, is gripped and held by a second industrial robot 21 within a gripping tolerance. A second compensation variable correcting the gripping tolerance is determined for the second industrial robot 21, such that the second object 22 is adjustable in a compensated manner in the spatial coordinate system by predetermining a position of the second industrial robot 21. The second compensation variable is determined by aligning the field of view 8 of the 3D image recording device 1 by means of the drive unit 3 with at least one portion of the second features 23 of the second object 22 held in a second compensation position of the second industrial robot 21. At least one second three-dimensional image is recorded. The position of the second object 22 in the spatial coordinate system in the second compensation position of the second industrial robot 21 is determined from the position P of the 3D image recording device 1, the angular alignment of the 3D image recording device 1, said angular alignment being detected by the angle measuring unit 4, the second three-dimensional image and the knowledge of the second features 23 on the second object 22. The second compensation variable is determined by utilizing the second compensation position of the second industrial robot 21 and at least the determined position of the second object 22 in the second compensation position of the second industrial robot 21. Afterward, the second object 22 is highly precisely adjusted to a second end position. This is done by means of the following steps that are repeated until the second end position is reached in a predetermined tolerance. Firstly, at least one further second three-dimensional image is recorded. The present position of the second object 22 in the spatial coordinate system is determined from the position P of the 3D image recording device 1, the angular alignment of the 3D image recording device 1, said angular alignment being detected by the angle measuring unit 4, the further second three-dimensional image and the knowledge of the second features 23 on the second object 22. The position difference between the present position of the second object 22 and the second end position is calculated. After the calculation of a new desired position of the second industrial robot 21 taking account of the second compensation variable from the present position of the second industrial robot 21 and a variable linked to the position difference, the second industrial robot 21 is adjusted to the new desired position. These steps are repeated until the second object 22 has reached the second end position in the predetermined tolerance.

Instead of a relative positioning of the two objects 12 and 22 in accordance with FIG. 2, therefore, in this embodiment of FIG. 3, the two objects 12 and 22 are highly precisely positioned individually and independently of one another.

In one development of the invention, after gripping the second object 22, the second industrial robot 21 is adjusted to the second compensation position of the second industrial robot 21 for determining the second compensation variable.

In a further embodiment variant of the invention it is provided that before the steps which are repeated until the second end position is reached in a predetermined tolerance, the second industrial robot 21 is adjusted taking account of the second compensation variable from the second compensation position to a position in which the second object 22 is positioned in a second approximation position near the second end position. Afterward, the field of view 8 of the 3D image recording device 1 is aligned by means of the drive unit 3 with at least one portion of the second features 23 of the second object 22 positioned in the second approximation position.

As is likewise illustrated in FIG. 3, but also possible in the embodiment from FIG. 2, a third object 32 embodied as a processing tool is provided. The processing tool 32 is held by a third industrial robot 31 within a holding tolerance. The processing tool 32 or a part of the third industrial robot 31 that is coupled thereto, for example the receptacle of the processing tool 32, has known optically detectable third features 33. In order to be able to adjust the processing tool 32 in a compensated manner in the spatial coordinate system by predetermining a position of the third industrial robot 31, a third compensation variable correcting the holding tolerance is determined for the third industrial robot 31. For this purpose, firstly the field of view 8 of the 3D image recording device 1 is aligned by means of the drive unit 3 with at least one portion of the third features 33. In this case, the processing tool 32 is held in a third compensation position of the third industrial robot 31. At least one third three-dimensional image is recorded. The position of the processing tool 32 in the spatial coordinate system in the third compensation position of the third industrial robot 31 is determined from the position P of the 3D image recording device 1, the angular alignment of the 3D image recording device 1, said angular alignment being detected by the angle measuring unit 4, the third three-dimensional image and the knowledge of the third features 33. The third compensation variable is determined by utilizing the third compensation position of the third industrial robot 31 and at least the determined position of the processing tool 32 in the third compensation position of the third industrial robot 31.

Furthermore, the invention provides for the processing tool 32 to be highly precisely adjusted to a third end position by means of the following steps that are repeated until the third end position is reached in a predetermined tolerance. At least one further third three-dimensional image is recorded. The present position of the processing tool 32 in the spatial coordinate system is determined from the position P of the 3D image recording device 1, the angular alignment of the 3D image recording device 1, said angular alignment being detected by the angle measuring unit 4, the further third three-dimensional image and the knowledge of the third features 33. The position difference between the present position of the third object 32 and the third end position is calculated. A new desired position of the third industrial robot 31 is calculated taking account of the third compensation variable from the present position of the third industrial robot 21 and a variable linked to the position difference. Afterward, the third industrial robot 31 is adjusted to the new desired position. These steps are repeated until the processing tool 32 is situated in the tolerance range of the third end position.

The processing tool 32 is, for example, a welding tool for the joining welding of the first object 12 and the second object 22. Any other processing tools, more particularly joining tools, can likewise be used. Even though a processing tool 32 in combination with a first object 12 and a second object 22, more particularly for joining these object, has been described at this juncture, the invention likewise encompasses positioning the processing tool relative to just one object. This can be the case for example for a processing tool that carries out a work step, for example a machining production step, on only one object.

The invention also encompasses the combinations of features not explicitly combined.

The system components described, more particularly the measuring components such as the recording devices, are distinguished by their mobility and flexibility. It is thus possible for the method described to be carried out by means of independent components which can be installed within a comparatively short time in a manufacturing system. Self-calibrating and self-referencing components make it possible to ensure a sufficient process reliability even under aggravated operating conditions. Even comparatively imprecise handling systems with relatively inaccurate measuring systems can be used on account of the determination of compensation variables and steps for highly precisely positioning objects that are repeated until the end position is reached. The invention makes it possible to carry out, without direct process participation contactlessly and at a sufficient distance, a rapid detection of the position of the objects within a very large detection range. Pivoting the 3D image recording device does not lead to a delay of the measurement operation caused by renewed referencing of the cameras, since renewed referencing can be obviated according to the invention. Consequently, the method and system according to the invention for highly precisely positioning objects in space are distinguished by a high process speed.

What is claimed is:

1. A method for highly precisely positioning at least one object in an end position in space by means of an industrial robot, comprising:
   a first industrial robot, which is adjustable into predeterminable positions; and
   an optical 3D image recording device, which:
      is calibrated in a three-dimensional spatial coordinate system and is positioned in a position with a known alignment;
      is designed for electronically recording three-dimensional images within a specific field of view, wherein the three-dimensional images are in each case composed of a multiplicity of pixels which are each assigned an item of depth information;
      has a drive unit for the alignment, and which brings about adjustment of the field of view, of the 3D image recording device; and
      has an angle measuring unit calibrated in the spatial coordinate system and serving for highly precisely detecting the angular alignment of the 3D image recording device, such that it is possible to determine the field of view in the spatial coordinate system,
   wherein:
      the position of the 3D image recording device in the spatial coordinate system is determined by aiming at stationary target marks by means of the 3D image recording device;
      a first object, which has known optically detectable first features, is gripped and held by the first industrial robot within a gripping tolerance; and
      a first compensation variable, correcting the gripping tolerance, for the first industrial robot is determined such that the first object is adjustable in a compensated fashion in the spatial coordinate system by pre-determining a position of the first industrial robot, wherein the first compensation variable is determined by the steps of:

aligning the field of view of the 3D image recording device by means of the drive unit with at least one portion of the first features of the first object held in a first compensation position of the first industrial robot;

recording at least one first three-dimensional image;

determining the position of the first object in the spatial coordinate system in the first compensation position of the first industrial robot from the position of the 3D image recording device, the angular alignment of the 3D image recording device, said angular alignment being detected by the angle measuring unit, the first three-dimensional image, and the knowledge of the first features on the first object; and determining the first compensation variable by utilizing the first compensation position of the first industrial robot, and at least the determined position of the first object in the first compensation position of the first industrial robot; and the first object is highly precisely adjusted to a first end position by the following steps, which are repeated until the first end position is reached in a predetermined tolerance:

recording at least one further first three-dimensional image;

determining the present position of the first object in the spatial coordinate system from the position of the 3D image recording device, the angular alignment of the 3D image recording device, said angular alignment being detected by the angle measuring unit, the further first three-dimensional image, and the knowledge of the first features on the first object;

calculating the position difference between the present position of the first object and the first end position; and calculating a new desired position of the first industrial robot taking account of the first compensation variable from the present position of the first industrial robot, and a variable which is linked to the position difference and is formed by the position difference multiplied by a factor of less than or equal to 1, and adjusting the first industrial robot to the new desired position.

2. The method as claimed in claim 1, wherein the stationary target marks and the known optically detectable first features of the first object are spaced apart in such a way that aiming at the stationary target marks and recording the at least one first three-dimensional image are effected with different alignments of the field of view of the 3D image recording device.

3. The method as claimed in claim 1, wherein after gripping the first object, the first industrial robot is adjusted to the first compensation position of the first industrial robot for determining the first compensation variable.

4. The method as claimed in claim 1, wherein before the steps which are repeated until the first end position is reached in a predetermined tolerance:

the first industrial robot is adjusted taking account of the first compensation variable from the first compensation position to a position in which the first object is positioned in a first approximation position near the first end position; and the field of view of the 3D image recording device is aligned by means of the drive unit with at least one portion of the first features of the first object positioned in the first approximation position.

5. The method as claimed in claim 1, wherein before highly precisely adjusting the first object to the first end position, a second object is gripped by a second industrial robot or manually and is positioned into an object mount in a second end position in the spatial coordinate system.

6. The method as claimed in claim 5, wherein the second object has known optically detectable second features, and, after positioning the second object in the object mount, the second end position of the second object in the spatial coordinate system is determined by the steps of:

aligning the field of view of the 3D image recording device by means of the drive unit with at least one portion of the second features of the second object;

recording at least one second three-dimensional image; and determining the second end position of the second object in the spatial coordinate system from the position of the 3D image recording device, the angular alignment of the 3D image recording device, said angular alignment being detected by the angle measuring unit, the second three-dimensional image, and the knowledge of the second features on the second object, wherein the first end position for the first object is calculated from the second end position of the second object and a predetermined relative position between the first object and the second object.

7. The method as claimed in claim 1, wherein, before highly precisely adjusting the first object to the first end position:

a second object, which has known optically detectable second features, is gripped and held by a second industrial robot within a gripping tolerance;

the second industrial robot is adjusted to an end position of the second industrial robot, in which position the second object is situated in a second end position; and the second end position of the second object in the spatial coordinate system is determined by the steps of:

aligning the field of view of the 3D image recording device by means of the drive unit with at least one portion of the second features of the second object;

recording at least one second three-dimensional image; and determining the second end position of the second object in the spatial coordinate system from the position of the 3D image recording device, the angular alignment of the 3D image recording device, said angular alignment being detected by the angle measuring unit, the second three-dimensional image, and the knowledge of the second features on the second object, wherein the first end position for the first object is calculated from the second end position of the second object and a predetermined relative position between the first object and the second object.

8. The method as claimed in claim 1, wherein, before highly precisely adjusting the first object to the first end position:

a second object, which has known optically detectable second features, is gripped and held by a second industrial robot within a gripping tolerance;

a second compensation variable, correcting the gripping tolerance, for the second industrial robot is determined such that the second object is adjustable in a compensated fashion in the spatial coordinate system by predetermining a position of the second industrial robot, wherein the second compensation variable is determined by the steps of:

aligning the field of view of the 3D image recording device by means of the drive unit with at least one portion of the second features of the second object held in a second compensation position of the second industrial robot;

recording at least one second three-dimensional image;

determining the position of the second object in the spatial coordinate system in the second compensation position of the second industrial robot from the position of the 3D image recording device, the angular alignment of the 3D image recording device, said angular alignment being detected by the angle measuring unit, the second three-dimensional image, and the knowledge of the second features on the second object; and determining the second compensation variable by utilizing the second compensation position of the second industrial robot, and at least the determined position of the second object in the second compensation position of the second industrial robot; and the second object is highly precisely adjusted to a second end position by the following steps, which are repeated until the second end position is reached in a predetermined tolerance:

recording at least one further second three-dimensional image, determining the present position of the second object in the spatial coordinate system from the position of the 3D image recording device; the angular alignment of the 3D image recording device, said angular alignment being detected by the angle measuring unit, the further second three-dimensional image, and the knowledge of the second features on the second object;

calculating the position difference between the present position of the second object and the second end position;

calculating a new desired position of the second industrial robot taking account of the second compensation variable from the present position of the second industrial robot, and a variable which is linked to the position difference and is formed, in particular, by the position difference multiplied by a factor of less than or equal to 1; and adjusting the second industrial robot to the new desired position.

9. The method as claimed in claim 8, wherein after gripping the second object the second industrial robot is adjusted to the second compensation position of the second industrial robot for determining the second compensation variable.

10. The method as claimed in claim 8, wherein before the steps which are repeated until the second end position is reached in a predetermined tolerance:

the second industrial robot is adjusted taking account of the second compensation variable from the second compensation position to a position in which the second object is positioned in a second approximation position near the second end position; and the field of view of the 3D image recording device is aligned by means of the drive unit with at least one portion of the second features of the second object positioned in the second approximation position.

11. The method as claimed in claim 1, wherein:

a third object embodied as a processing tool is held by a third industrial robot within a holding tolerance;

the processing tool or a part coupled thereto of the third industrial robot has known optically detectable third features; and a third compensation variable, correcting the holding tolerance, for the third industrial robot is determined such that the processing tool is adjustable in a compensated fashion in the spatial coordinate system by predetermining a position of the third industrial robot, wherein the third compensation variable is determined by the steps of:

aligning the field of view of the 3D image recording device by means of the drive unit with at least one portion of the third features, the processing tool being held in a third compensation position of the third industrial robot;

recording at least one third three-dimensional image;

determining the position of the processing tool in the spatial coordinate system in the third compensation position of the third industrial robot from the position of the 3D image recording device, the angular alignment of the 3D image recording device, said angular alignment being detected by the angle measuring unit, the third three-dimensional image, and the knowledge of the third features; and determining the third compensation variable by utilizing the third compensation position of the third industrial robot, and at least the determined position of the processing tool in the third compensation position of the third industrial robot.

12. The method as claimed in claim 11, wherein the processing tool is highly precisely adjusted to a third end position by the following steps, which are repeated until the third end position is reached in a predetermined tolerance:

recording at least one further third three-dimensional image;

determining the present position of the processing tool in the spatial coordinate system from the position of the 3D image recording device, the angular alignment of the 3D image recording device, said angular alignment being detected by the angle measuring unit, the further third three-dimensional image, and the knowledge of the third features;

calculating the position difference between the present position of the third object and the third end position;

calculating a new desired position of the third industrial robot taking account of the third compensation variable from the present position of the third industrial robot, and a variable which is linked to the position difference and is formed, in particular, by the position difference multiplied by a factor of less than or equal to 1; and adjusting the third industrial robot to the new desired position.

13. The method as claimed in claim 1, wherein:

the features are substantially known from a model which can be processed by an electronic data processing device, by means of image processing executed on an electronic data processing device, the features in the model and/or in the image recordings are identified and the features from the model and the features from the image recordings are assigned to one another; and the position of the object in the spatial coordinate system is determined from the detected position of the recorded features in the spatial coordinate system and the assigned features.

14. The method as claimed in claim 13, wherein:
the relative position of the recorded features with respect to one another is determined and is compared with the relative position of the features substantially known from the model with respect to one another.

15. The method as claimed in claim 13, wherein:
the relative position of the recorded features with respect to one another is determined and is compared with the relative position of the features substantially known from the model with respect to one another;
a fault message is output when a deviation between the relative position of the recorded features and the relative position of the features substantially known from the model is exceeded;
in the case of the fault message, the object is exchanged for a new object, and
the model is adapted to the detected object and the adapted model determines the end position in the spatial coordinate system.

16. The method as claimed claim 1, wherein the 3D image recording device is embodied in such a way that:
at least one first camera can be aligned by means of the drive unit about in each case a horizontal tilting axis with respect to the spatial coordinate system and a vertical axis; and
the angle measuring unit in each case detects the horizontal angular alignment about the vertical axis and the vertical angular alignment about the tilting axis in the spatial coordinate system.

17. The method as claimed claim 1, wherein the 3D image recording device is embodied in such a way that:
at least one first camera can be aligned by means of the drive unit about in each case a horizontal tilting axis with respect to the spatial coordinate system and a vertical axis;
the angle measuring unit in each case detects the horizontal angular alignment about the vertical axis and the vertical angular alignment about the tilting axis in the spatial coordinate system; and
the horizontal tilting axis and the vertical axis substantially intersect.

18. The method as claimed in claim 17, wherein the first camera is embodied as an RIM camera for directly recording the three-dimensional image composed of a multiplicity of pixels each having assigned depth information.

19. The method as claimed in claim 17, wherein the 3D image recording device has an electro-optical distance measuring device and the three-dimensional image is generated by detecting the items of depth information by means of at least one optical depth measurement on sections of the object which correspond to the pixels by means of the electro-optical distance measuring device, and assigning the items of depth information to the multiplicity of pixels.

20. The method as claimed in claim 17, wherein:
the 3D image recording device has an electro-optical distance measuring device and the three-dimensional image is generated by detecting the items of depth information by means of at least one optical depth measurement on sections of the object which correspond to the pixels by means of the electro-optical distance measuring device, and assigning the items of depth information to the multiplicity of pixels; and
the electro-optical distance measuring device:
is embodied as a point scanner and the items of depth information are detected by serial scanning by means of the point scanner, wherein at least one point-like measurement beam optically scans point by point an area of the object which corresponds to the field of view; or
is embodied as a line scanner and the items of depth information are detected by parallel scanning by means of the line scanner, wherein at least one line-like measurement beam optically scans line by line an area of the object which corresponds to the field of view; or
is embodied as an area depth measuring device and the items of depth information are detected by fully parallel scanning by means of the area depth measuring device, wherein at least one areal measurement beam, formed in particular by a bundle composed of a multiplicity of measurement beams, optically scans area by area an area of the object which corresponds to the field of view.

21. The method as claimed in claim 17, wherein
the 3D image recording device has a second camera which is coupled to the first camera in such a way and is arranged at a distance from the first camera in such a way that the at least partly overlapping fields of view of the cameras form the field of view of the 3D image recording device in their overlap region; and
the three-dimensional image is generated in the field of view of the 3D image recording device from the knowledge of the relative perspectives of the cameras with respect to one another by means of image processing.

22. A system for highly precisely positioning at least one object in an end position in space by means of an industrial robot, comprising:
a first industrial robot, which is adjustable into predeterminable positions;
an optical 3D image recording device, which is calibrated in a three-dimensional spatial coordinate system and is positioned in a known position with a known alignment, is designed for electronically recording three-dimensional images within a specific field of view, wherein the three-dimensional images are in each case composed of a multiplicity of pixels which are each assigned an item of depth information, has a drive unit for the alignment, which brings about adjustment of the field of view—of the 3D image recording device, and has an angle measuring unit calibrated in the spatial coordinate system and serving for highly precisely detecting the angular alignment of the 3D image recording device, such that it is possible to determine the field of view in the spatial coordinate system; and
a control apparatus, which has a data processing device designed for image processing, wherein the control apparatus has a data connection to the first industrial robot and the optical 3D image recording device in such a way that:
the three-dimensional images recorded by the optical 3D image recording device are fed to the control apparatus;
the angular alignment of the 3D image recording device, said angular alignment being detected by the angle measuring unit, is fed to the control apparatus;
the drive unit is driven for aligning the 3D image recording device by means of the control apparatus; and
the first industrial robot is adjusted in positions that are predetermined by the control apparatus, wherein the control apparatus and the data processing device thereof are designed in such a way that:
   a first object, which has optically detectable first features known to the control apparatus, is gripped and held by the first industrial robot within a gripping tolerance;
   a first compensation variable, correcting the gripping tolerance, for the first industrial robot is determined by the control apparatus such that the first object is adjustable in a compensated fashion in the spatial coordinate system by predetermining a position of the first industrial robot, wherein the first compensation variable is determined by means of the control apparatus by the steps of:
      aligning the field of view of the 3D image recording device by means of the drive unit with at least one portion of the first features of the first object held in a first compensation position of the first industrial robot;
      recording at least one first three-dimensional image;
      determining the position of the first object in the spatial coordinate system in the first compensation position of the first industrial robot from the position of the 3D image recording device, the angular alignment of the 3D image recording device, said angular alignment being detected by the angle measuring unit, the first three-dimensional image, and the knowledge of the first features on the first object; and
      determining the first compensation variable by utilizing the first compensation position of the first industrial robot, and at least the determined position of the first object in the first compensation position of the first industrial robot, and
   the first object is highly precisely adjusted by the control apparatus to a first end position by the following steps, which are repeated until the first end position is reached in a predetermined tolerance:
      recording at least one further first three-dimensional image;
      determining the present position of the first object in the spatial coordinate system from:
         the position of the 3D image recording device;
         the angular alignment of the 3D image recording device, said angular alignment being detected by the angle measuring unit;
         the further first three-dimensional image; and
         the knowledge of the first features on the first object;
      calculating the position difference between the present position of the first object and the first end position;
      calculating a new desired position of the first industrial robot taking account of the first compensation variable from the present position of the first industrial robot, and a variable which is linked to the position difference and is formed, in particular, by the position difference multiplied by a factor of less than or equal to 1; and
      adjusting the first industrial robot to the new desired position.

23. The system as claimed in claim 22, wherein the optical 3D image recording device is embodied in such a way that:
   at least one first camera can be aligned by means of the drive unit about in each case a horizontal tilting axis with respect to the spatial coordinate system and a vertical axis; and
   the angle measuring unit in each case detects the horizontal angular alignment about the vertical axis and the vertical angular alignment about the tilting axis in the spatial coordinate system.

24. The system as claimed in claim 22, wherein the optical 3D image recording device is embodied in such a way that:
   at least one first camera can be aligned by means of the drive unit about in each case a horizontal tilting axis with respect to the spatial coordinate system and a vertical axis;
   the angle measuring unit in each case detects the horizontal angular alignment about the vertical axis and the vertical angular alignment about the tilting axis in the spatial coordinate system; and
   the horizontal tilting axis and the vertical axis substantially intersect.

25. The system as claimed in claim 24, wherein the first camera is embodied as an RIM camera for directly recording the three-dimensional image composed of a multiplicity of pixels each having assigned depth information.

26. The system as claimed in claim 24, wherein:
   the 3D image recording device has an electro-optical distance measuring device; and
   the control apparatus and the data processing device thereof and/or the 3D image recording device are embodied in such a way that the three-dimensional image is generated by detecting the items of depth information by means of at least one optical depth measurement on sections of the object which correspond to the pixels by means of the electro-optical distance measuring device, and assigning the items of depth information to the multiplicity of pixels.

27. The system as claimed in claim 26, wherein the electro-optical distance measuring device:
   is embodied as a point scanner and the items of depth information are detected by serial scanning by means of the point scanner; wherein at least one point-like measurement beam optically scans point by point an area of the object which corresponds to the field of view; or
   is embodied as a line scanner and the items of depth information are detected by parallel scanning by means of the line scanner, wherein at least one line-like measurement beam optically scans line by line an area of the object which corresponds to the field of view; or
   is embodied as an area depth measuring device and the items of depth information are detected by fully parallel scanning by means of the area depth measuring device, wherein at least one areal measurement beam, formed in particular by a bundle composed of a multiplicity of measurement beams, optically scans area by area an area of the object which corresponds to the field of view.

* * * * *